(12) United States Patent
Vankerkhove (10) Patent No.: US 8,913,236 B2
(45) Date of Patent: Dec. 16, 2014

(54) METHOD AND DEVICE FOR MEASURING FREEFORM SURFACES

(75) Inventor: Steven J Vankerkhove, Webster, NY (US)

(73) Assignee: Corning Incorporated, Corning, NY (US)

( * ) Notice: Subject to any disclaimer, the term of this patent is extended or adjusted under 35 U.S.C. 154(b) by 778 days.

(21) Appl. No.: 13/220,826

(22) Filed: Aug. 30, 2011

(65) Prior Publication Data

US 2013/0054192 A1    Feb. 28, 2013

(51) Int. Cl.
  *G01B 9/00*   (2006.01)
  *G01M 11/00*  (2006.01)
  *G01B 11/24*  (2006.01)
  *G01B 9/02*   (2006.01)

(52) U.S. Cl.
  CPC ............ *G01M 11/005* (2013.01); *G01B 11/24* (2013.01); *G01B 9/02039* (2013.01)
  USPC .......................................... 356/124; 356/125

(58) Field of Classification Search
  USPC ................................................. 356/124, 125
  See application file for complete search history.

(56) References Cited

U.S. PATENT DOCUMENTS

| | | | |
|---|---|---|---|
| 3,305,294 A | | 2/1967 | Alvarez |
| 3,507,565 A | | 4/1970 | Alvarez et al. |
| 4,743,117 A | * | 5/1988 | Kitabayashi et al. ......... 356/520 |
| 5,844,670 A | * | 12/1998 | Morita et al. .................. 356/124 |
| 6,714,307 B2 | * | 3/2004 | De Groot et al. ............. 356/512 |
| 7,030,996 B2 | * | 4/2006 | De Groot et al. ............. 356/512 |
| 7,140,119 B2 | | 11/2006 | Badami et al. |
| 2013/0235477 A1 | * | 9/2013 | Furukawa et al. ............. 359/718 |
| 2013/0235478 A1 | * | 9/2013 | Maeda, Yoshiki ............. 359/718 |

FOREIGN PATENT DOCUMENTS

| | | |
|---|---|---|
| WO | 2008012091 A2 | 1/2008 |
| WO | 2009126269 A2 | 10/2009 |

\* cited by examiner

*Primary Examiner* — Roy M Punnoose
(74) *Attorney, Agent, or Firm* — John P. Ciccarelli; Walter M. Douglas (57) ABSTRACT

An optical measuring instrument for measuring aspheric surfaces includes an optical measuring arm and a multi-axis drive platform. The optical measuring arm provides for illuminating and imaging the aspheric surfaces. The multi-axis drive platform relatively moves the optical measuring arm with respect to the aspheric surfaces through a plurality of subaperture measurement positions. A focus of adjustable focusing optic is maintained at a nominal center of curvature of the aspheric surfaces. A variable optical aberrator adds aberration to an illumination wavefront to match the illumination wavefront to the intended local shape of the aspheric surface. Fitted low-frequency shape information is distinguished from a remainder of the local shape information yielding mid-frequency topographic measurements of the subapertures, which can be assembled to construct a profile measurement of the aspheric surface.

26 Claims, 8 Drawing Sheets

| |
|---|
| A. Initialize axes |
| B. Align aspheric surface. |
| C. Select illumination field aperture |
| D. Adjust rotational axes ($\theta=0$, $\Phi=0$). |
| E. Adjust first translational axis. |
| F. Adjust focusing optic. |
| G. Adjust second translational axis. |
| H. Adjust variable optical aberrator. |
| I. Readjust as needed. |
| J. Acquire subaperture measurement. |
| K. Adjust second rotational axis ($\Phi \neq 0$). |
| L. Repeat steps E-J. |
| M. Adjust first rotational axis ($\theta \neq 0$). |
| N. Repeat steps E-J |
| O. Repeat steps M-N until ($\theta = \max \theta$) |
| P. Repeat steps K-O until ($\Phi = \max \Phi$) |
| Q. Data reduction, mid-frequency error |
| R. Data reduction, low-frequency error |
| S. Present profile map |

FIG. 10

METHOD AND DEVICE FOR MEASURING FREEFORM SURFACES

TECHNICAL FIELD

The invention relates to the optical measurement of freeform surfaces of test objects and particularly to the shaping of illumination wavefronts to approximate the freeform surfaces and to the collection and interpretation of test wavefronts returned from the freeform surfaces.

BACKGROUND OF THE INVENTION

Freeform surfaces containing multiple curvatures, such as aspheres, present challenges for optical measurement. For example, freeform test surfaces that depart from spheres or planes present problems relating to both the range of measurement and the accuracy with which the freeform surfaces can be measured. Particularly for purposes of wavefront measurements, illumination is generally intended to be directed at normal incidence to the freeform surfaces for collecting retroreflected light from the freeform surfaces. Departures of illumination wavefront shapes from the intended shapes of the freeform surfaces can exceed the range of measurement and introduce measurement errors.

Measuring instruments, particularly those that exploit the mechanism of interference, generally have limited ranges of measurement. Even relatively small departures of the shape of freeform surface from the shape of the illumination wavefront can exceed the dynamic range of the measuring instruments. For example, the fringe spacing of interference patterns representing differences between the shapes of the freeform surface and a reference surface modeled by the illumination wavefront rapidly decreases with increasing differences between the shapes, rendering the interference patterns ambiguous or indecipherable.

Shaping the illumination wavefronts to more closely match the intended shape of the test objects can be difficult to accomplish. Wavefront shaping optics must be changed to accommodate different freeform shapes of the test objects. The substitution of different shaping optics is expensive and difficult to calibrate. The use of adjustable shaping optics can lead to errors or loss of accuracy, especially where the contributions of the shaping optics must be monitored to account for the changes of wavefront shape. The contributions of the shaping optics to the reference against which the freeform surfaces are compared are often difficult to determine, especially when subject to change, and can introduce various types of errors as well as ambiguities that are difficult to resolve to desired accuracy.

Some measuring instruments produce conventional illumination wavefronts, e.g., spherical wavefronts, and match the curvature of the illumination wavefronts to limited size zones of the freeform surfaces. Measurements of the limited zones of the freeform surfaces are stitched together to provide overall measurements of the freeform surfaces. This approach has been used for measuring rotationally symmetric test surfaces, where the limited zones have an annular form. However, non-rotationally symmetric test surfaces and other surface shapes that depart more significantly from a conventional form can require the measurement zones to be so small that an inordinate number of measurement zones must be acquired, thereby increasing measurement time, adding complexity of the measurements, and reducing overall accuracy, which can be compromised by additional variables associated with stitching the many zonal measurements together.

SUMMARY OF THE INVENTION

The invention in a preferred respect provides for optically measuring a range of freeform test surfaces. For example, the intended local shapes of aspheric freeform test surfaces can be approximated at a succession of measurement positions by relatively rotating or pivoting an optical measuring arm with respect to the aspheric surfaces about orthogonal rotational axes while adjusting a focal length of a variable focusing optic. The focal points of the variable focusing optic and the nominal centers of curvature of the intended aspheric surface are preferably maintained coincident with a crossing point of the rotational axes. The aspheric surface is also preferably maintained conjugate to both an illumination field aperture and a detector surface. Illumination wavefronts of the measuring beam having radii of curvature centered at the crossing point by the variable focusing optic can be systematically aberrated (e.g., modified from a spherical form) to more closely approximate the intended local shape of the aspheric surfaces. While the aberrated illumination wavefronts are intended to more closely match the local shapes of the aspheric surfaces within the dynamic measurement range of the measuring arm, the exact shape of the aberrated illumination wavefronts is not required to be precisely monitored as a reference against which the aspheric surfaces are measured.

At any one measurement position monitored by the relative rotational positions of the measuring arm and the aspheric surface, the aspheric surface can be translated with respect to the crossing point of the two rotational axes to maintain local centers of curvature of the intended, i.e., ideal, aspheric surface at the crossing point. The measuring arm, which can be arranged to carry the imaging optics and the detector surface, can be translated with respect to the crossing point to maintain the aspheric surface conjugate to the detector surface. The focal length of the variable focusing optic, which is also preferably carried by the measuring arm, can be adjusted to maintain the focus of the focusing optic at the crossing point. The relative translation of the aspheric surface, the relative translation of the measuring arm, and the change in focal length are all related to the anticipated change in the nominal curvature of the aspheric surface at the measurement position.

The systematic aberrations of the illumination wavefronts, which can include astigmatism, coma, and trefoil, can be approximately matched to the intended local shape (e.g., specified mathematical descriptions) of the aspheric surfaces at each relative angular position of the measuring arm, otherwise defined by the relative rotational positions of the of the measuring arm with respect to the aspheric surface. At each measurement position, the systematic aberrations introduced into the measuring beam expand the local areas of the aspheric surface over which light reflected from the aspheric surface remains within the dynamic measuring range of the measuring arm. Measurements of test wavefronts returning (e.g., reflected) from each measurement position, which are referred to as subaperture measurements, can be assembled together to characterize the entire aspheric test surface.

For purposes of scaling the individual subaperture measurements, an illumination field aperture having a known size is preferably located conjugate to both the aspheric surface and the detector surface. Accordingly, an image of the illumination field aperture appearing on both the aspheric surface and the detector surface can be used to scale each of the subaperture measurements to the known size of the illumination field aperture.

Most mismatch between the curvature of the illumination wavefront and the intended local shape of the aspheric surface (generally defined by a mathematical description), as well as additional aberration associated with the further propagation of the measuring beam, can be distinguished from profile measurements of the freeform surfaces. Mid-frequency profile characteristics, which are a subject of the measurement, represent small local variations in the freeform surfaces (e.g., waviness) and can be readily distinguished from low-frequency shape characteristics pertaining to the intended, i.e., ideal, form of the freeform surfaces. The low-frequency shape characteristics are of the order of the aberrations needed to define the intended local shapes of the aspheric surface. For example, the low-frequency shape characteristics can be represented by Zernike polynomials of radial and azimuthal shape variations that can be subtracted or otherwise distinguished from the total measured shape characteristics to yield the mid-frequency profile characteristics. Based on the monitored angular positions of each measurement and the known size of each subaperture measurement, the mid-frequency profile characteristics within each subaperture can be readily assembled together to construct a profile map of the entire freeform test surface.

One version of the invention as an optical measuring instrument for measuring aspheric test surfaces features an optical measuring arm and a multi-axis drive platform. The measuring arm carries a detector for capturing information regarding wavefront shape and imaging optics incorporating a variable focusing optic for imaging subapertures of the aspheric surface onto the detector. The multi-axis drive platform includes first and second rotational axes for relatively moving the optical measuring arm with respect to the aspheric surface through a plurality of subaperture measurement positions, a first translational axis for maintaining different centers of curvature associated with the intended local shape of the aspheric surface at a crossing point of the first and second rotational axes through the plurality of subaperture measurement positions, and a second translational axis for maintaining the subapertures of the aspheric surface conjugate to the detector. The adjustable focusing optic provides for maintaining a focus of the focusing optic at the crossing point of the first and second rotational axis through the plurality of subaperture measurement positions.

Preferably, the first translational axis relatively moves the aspheric surface with respect to the crossing point and the second translational axis relatively moves the measuring arm with respect to the crossing point. Sensors preferably monitor rotational positions of the rotational axes. An illumination field aperture having a known size can be located optically conjugate to both the subapertures of the aspheric surface and the detector. That is, the illumination field aperture can be imaged onto both the aspheric surface and the detector. Thus, the detector captures images of both the subapertures of aspheric surface and the illumination field aperture. A processor can be arranged to process the subaperture images of the aspheric surface and the illumination field aperture together with the monitored rotational positions of the rotational axes to assemble a profile measurement of the aspheric surface.

The variable focusing optic provides for shaping an illumination wavefront, and a variable optical aberrator can be arranged for adding aberration to the illumination wavefront to more closely match the illumination wavefront to the intended local shape of the aspheric surface. The variable focusing optic preferably functions as an objective, and the variable optical aberrator is preferably located adjacent to the variable focusing optic. The processor preferably extracts local shape information from subaperture images of the aspheric surface captured by the detector and distinguishes fitted low-frequency shape information having an order corresponding to an order of aberration needed to define the intended local shape of the aspheric surface from a remainder of the local shape information yielding mid-frequency profile measurements of the subapertures. In addition, the processor preferably assembles the mid-frequency profile measurements of the subapertures to construct a profile map of the aspheric surface.

The variable focusing optic contributes second order curvature to the illumination wavefront and the variable optical aberrator preferably contributes at least one of a second order astigmatism and a third order coma to the illumination wavefront to more closely match the illumination wavefront to the intended local shape of the aspheric surface within a measurement range of the detector. The fitted low-frequency shape information preferably includes terms corresponding to the contributions of the variable focusing optic and the variable optical aberrator to the illumination wavefront.

Polynomial expressions, such as Zernike polynomials can be fitted to the captured shape information to identify the low-frequency shape information, which can include both errors attributable to the aspheric surface as well as errors attributable to the measurement wavefront with respect to the intended form of the aspheric surface. The fitted expressions can be subtracted from the captured shape data to directly discount their influence. The remaining mid-frequency shape information from each of the subapertures can be readily assembled to construct the desired profile map of the aspheric surface.

The fitted low-frequency shape information can include both terms corresponding to the one or more types of aberrations introduced into the illumination wavefront and other terms corresponding to types of aberrations not introduced into the illumination wavefront but necessary to define the precise shape of the aspheric surface within the individual subapertures. The values of corresponding terms defining the intended local shape of the aspheric surface can be subtracted from the values of these other terms within the fitted low-frequency shape information to retrieve additional shape information from the subaperture measurements as certain low-frequency departures of the aspheric surface.

In situations such as when less accuracy is required, the aberrations introduced into the illumination wavefront can be estimated. For example, settings of the variable optical aberrator can be monitored and applied to empirically or theoretically derived contributions of the variable optical aberrator at the monitored settings. Any differences between the values of corresponding terms defining the intended local shape of the aspheric surface and the values of the terms defining the estimated aberrations can be subtracted from the values of these terms within the fitted low-frequency shape information to retrieve further shape information from the subaperture measurements as certain other (e.g., the remaining) low-frequency departures of the aspheric surface.

The calculated low-frequency departures of the of the individual subapertures can be assembled together and combined with the previously assembled profile map of the aspheric surface or combined with the individual mid-frequency subaperture measurements and jointly assembled together to construct a profile map of the aspheric surface containing measurements of both low-frequency and mid-frequency errors.

DETAILED DESCRIPTION OF THE INVENTION

Figure 1:
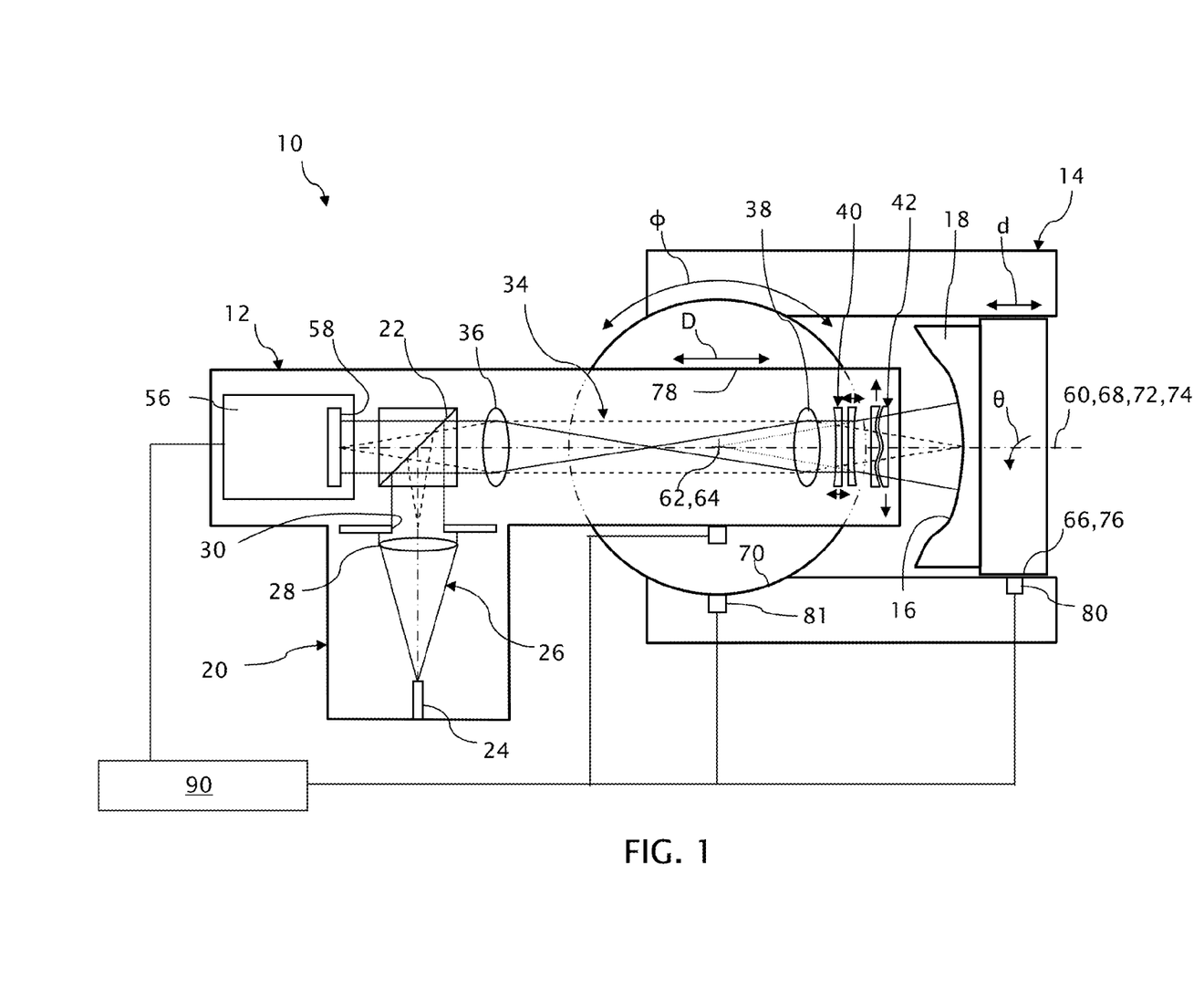
FIG. 1 is a schematic diagram of an optical measuring instrument for measuring a concave aspheric surface in accordance with one embodiment of the invention.

An optical measuring instrument 10 depicted in FIG. 1 includes a measuring arm 12 and a multi-axis drive platform 14 for measuring a generally concave aspheric freeform surface 16 of a test object 18. The measuring arm 12 is coupled to an illuminator arm 20 through a beamsplitter 22. Within the illuminator arm 20, a light source 24, such as may be derived directly from a laser light source or light emitting diode or indirectly through a single mode fiber, emits a measurement beam 26 that propagates through the optical measuring instrument 10. Initially, the measurement beam 26 emerges from light source 24 or associated optics as a diverging beam that is collimated by a collimator lens 28. An illumination field aperture 30 having a known size forms a boundary of the collimated measuring beam 26. Preferably, the measuring beam 26 is both spatially and temporally coherent to the extent required to perform the desired measurements.

The beamsplitter 22 reflects at least a portion of the collimated measuring beam 26 into the measuring arm 12. A 4f imaging system 34 carried by the measuring arm 12 includes imaging lens elements 36 and 38 and a variable focusing optic 40 for forming an image of the illumination field aperture 30 on the concave aspheric surface 16. Preferably, the imaging lens element 36 is located at its focal length from the illumination field aperture 30, the imaging lens element 38 is located at an effective focal length from the concave aspheric surface 16 (accounting for the effect of the focusing optic 40), and imaging lens elements 36 and 38 are spaced apart through their two focal lengths. The variable focusing optic 40 (shown relatively enlarged in FIG. 2) is adjustable for converting the shape of the measuring beam 26 from a collimated beam having a planar illumination wavefront 44 into a diverging beam having a spherical illumination wavefront 46 while imaging the illumination field aperture 30 onto the concave aspheric surface 16.

A variable optical aberrator 42 (shown relatively enlarged in FIG. 2) is also preferably carried by the measuring arm 12 for further shaping the measuring beam 26 as an aspheric illumination wavefront 48. The variable optical aberrator 42, which is preferably located adjacent to the variable focusing optic 40 (i.e., on either side of the variable focusing optic 40), contributes higher order aberration to the further propagating aspheric illumination wavefront 48, such as astigmatism, coma, or trefoil.

Figure 3:
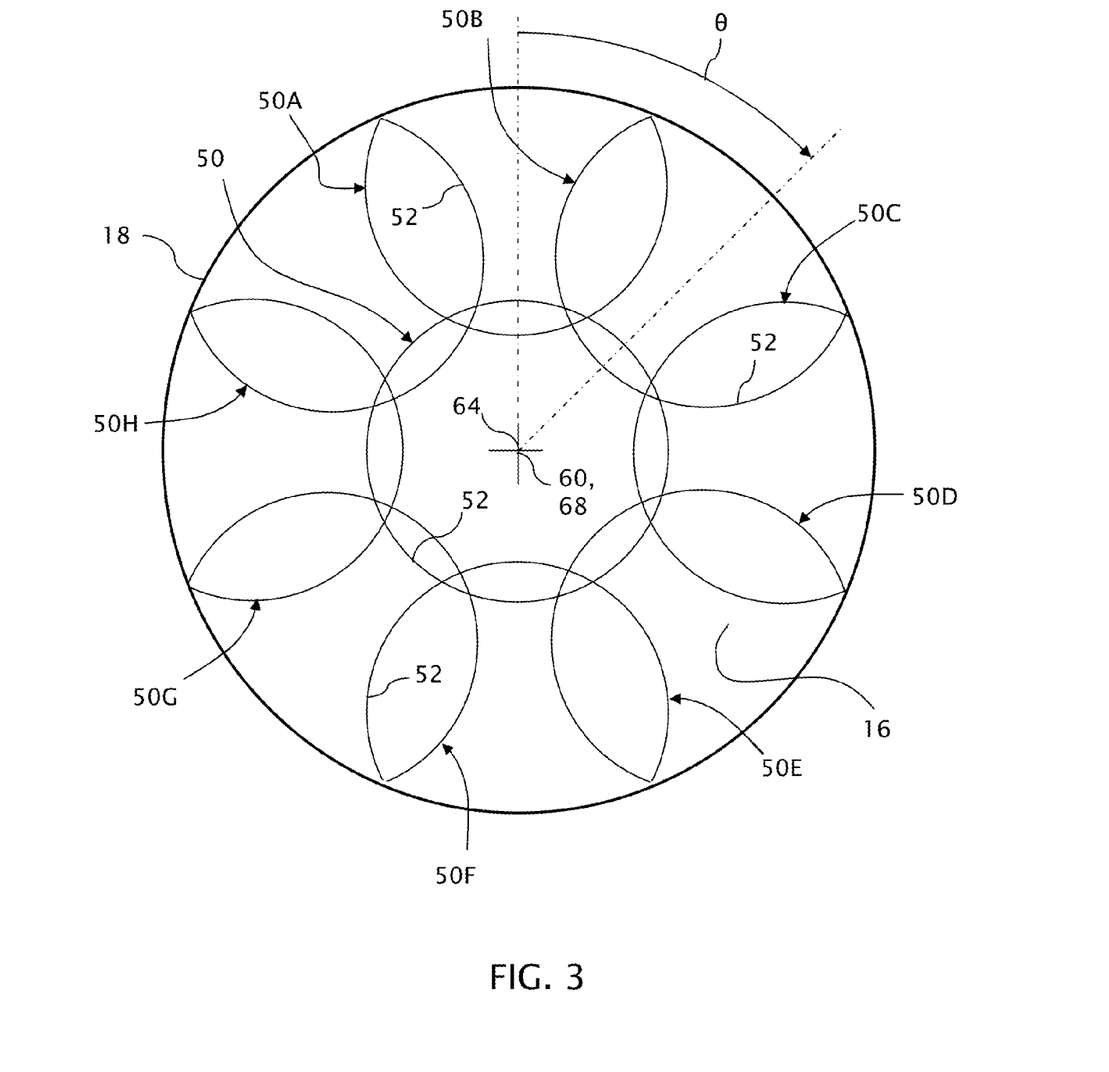
FIG. 3 is an on-axis view of the concave aspheric surface showing a plurality of subaperture subject to measurement.

With additional reference to FIG. 3, the diverging measuring beam 26 illuminates a subaperture 50 of the concave aspheric surface 16 within the illuminated area bounded by an image 52 of the illumination field aperture 30. The aspheric illumination wavefront 48 is shaped to at least approximately correspond to the intended, i.e., ideal, topographic shape of the concave aspheric surface 16 within the subaperture 50. The intended topographic shape of the concave aspheric surface 16 within the subaperture 50 to which the illumination wavefront 48 is shaped is generally defined by a mathematical description or admits of such a definition. For convenience, the mathematical description of the intended subaperture shape is preferably drawn in terms of aberrations including terms for piston, tip and tilt, a defocus term for defining the overall radial curvature of the subaperture 50 and any other needed radial or azimuthal terms such as for astigmatism, coma, trefoil, and spherical aberration.

Since the illumination wavefront 48 is shaped to at least approximately match the intended topographic shape of the subaperture 50, the diverging measuring beam 26 substantially retroreflects from the concave aspheric surface 16 as a converging measuring beam 26 with a test wavefront 54 having a shape incorporating twice the optical path length differences between the shape of the illumination wavefront 48 and the actual topographic shape of the subaperture 50. The returning measuring beam 26 propagates back through the variable optical aberrator 42 and the imaging system 34, including the variable focusing optic 40, to the beamsplitter 22, which transmits at least a portion of the returning measuring beam 26 to a wavefront sensor 56.

Similar to the illumination field aperture 30, a detector surface 58 of the wavefront sensor 56 is preferably spaced from the imaging lens element 36 at its focal length. Thus, the illumination field aperture 30, the detector surface 58, and the subaperture 50 of the concave aspheric surface 16 are all optically conjugate, and the imaging system 34 forms an image of the subaperture 50 together with the projected illumination field aperture 30, which forms the boundary 52 of the subaperture 50, onto the detector surface 58. Although the imaging system 34 is shown as a 4f imaging system with two imaging lens elements 36 and 38 and a variable focusing optic 40, the imaging system 34 can cake a variety of other forms, including forms with more or less lens elements of different sizes and focal lengths, for imaging portions of the concave aspheric surface 16 onto the detector surface 58.

The multi-axis drive platform 14 includes first and second rotational axes 60 and 62 that preferably intersect at a crossing point 64 in an orthogonal orientation. The first rotational axis 60, which is preferably guided by a rotational air bearing 66, rotates the test object 18 together with the concave aspheric surface 16 about a central axis 68 of the aspheric surface 16 through a full $2\pi$ range of azimuthal angles $\theta$. The second rotational axis 62, which is preferably guided by a rotational air bearing 70, pivots the measuring arm 12 through a range of polar angles $\phi$. The relative rotations of the concave aspheric surface 16 through azimuthal angles $\theta$ and the measuring arm 12 through polar angles $\phi$ define a succession of subaperture measurement positions in which different subapertures, e.g., subapertures 50A-50H of the concave aspheric surface 16 as shown in FIG. 3, are illuminated and imaged onto the detector surface 58.

Figure 2:
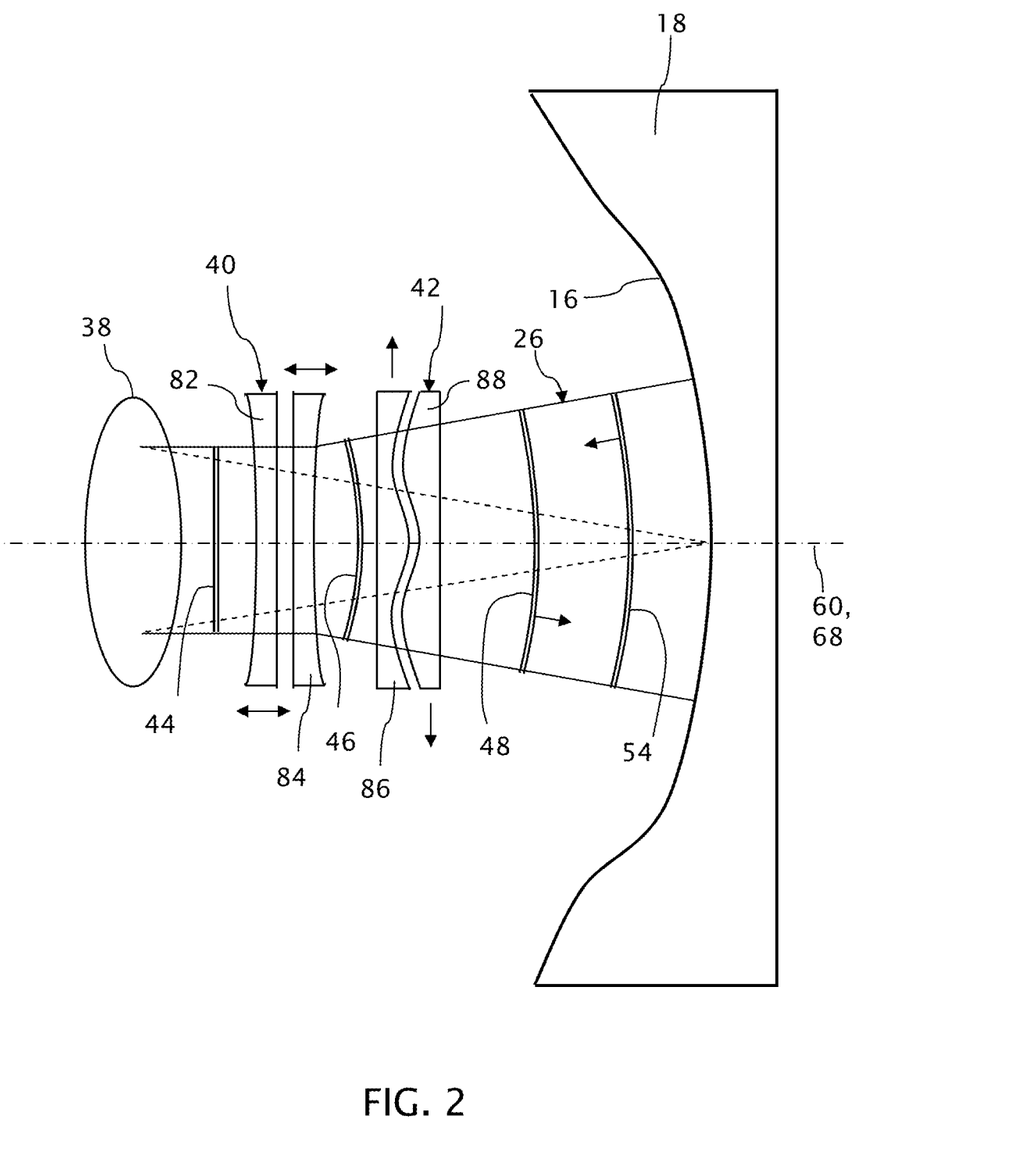
FIG. 2 is an enlarged diagram of a portion of an optical measuring arm adjacent to the concave aspheric surface

The multi-axis drive platform 14 also includes first and second translational axes 72 and 74. The first translational axis 72, which is preferably coincident with the first rotational axis 60 and guided by a roller bearing 76, translates the concave aspheric surface 16 together with the rotational air bearing 66 with respect to the crossing point 64 of the rotational axes 60 and 62 through various displacements d. The second translational axis 74, which is preferably guided by a roller bearing 78, translates the measuring arm 12 with respect to the crossing point 64 of the rotational axes 60 and 62 through various displacements D. In the views of FIGS. 1 and 2, where the polar angle $\phi$ is equal to zero, the second translational axis 74 is also coincident with the first rotational axis 60 and the first translational axis 72, but for all other non-supplementary polar angles $\phi$, the second translational axis 74 is inclined to the first rotational axis 60 and the first translational axis 72 through the non-supplementary polar angles $\phi$. Rotational sensors 80 and 81 monitor the angular positions of the rotational axis 60 and 62 for monitoring each of a succession of measurement positions ($\theta$, $\phi$), such as shown in FIG. 3 as subapertures 50, and 50A-50H, for measuring the entire concave aspheric surface 16 or as much of the aspheric surface 16 for which measurement data is needed. The entire concave aspheric surface 16 as shown in FIG. 3 is captured by (a) one on-axis measurement, where of angle $\phi$ equals zero corresponding to subaperture 50, and (b) eight off-axis measurements, where angle $\phi$ equals a non-zero constant and $\theta$ equals a multiple of $\pi/4$ corresponding to subapertures 50A-50H. More or less measurement positions ($\theta$, $\phi$) can be used for measuring the concave aspheric surface 16 with differently sized subapertures or different aspheric surfaces.

At any one measurement position ($\theta$, $\phi$), the concave aspheric surface 16 is preferably displaced a distance d along the first translational axis 72 so that the center of curvature of the intended topographic shape of the subaperture 50 or any one of the other subapertures 50A-50H is located at the crossing point 64 of the two rotational axes 60 and 62. The local center of curvature can be determined as a best fit spherical surface to the intended topographic shape of the concave aspheric surface 16 within the instant subaperture 50 or 50A-50H. For example a second order Zernike polynomial including a term for defocus (i.e., field curvature) can be fit to a mathematical representation of the intended topographic shape of the instant subaperture 50 or 50A-50H.

The measuring arm 12 at the instant measurement position ($\theta$, $\phi$) is preferably displaced a distance D along the second translational axis 74 so that the instant subaperture 50 or 50A-50H of the concave aspheric surface 16 remains conjugate to both the detector surface 58 and the illumination field aperture 30. The illuminator aperture 30, the imaging system 34, and the detector surface 58, all move together with the measuring arm 12, so that the displacement D of the measuring arm 12 along the second translational axis 74 compensates for the displacement of the concave aspheric surface 16 along the first translational axis 72.

The variable focusing optic 40, which is depicted as having two displaceable lens elements 82 and 84, is preferably adjusted to position its focal point at the crossing point 64 between the two rotational axes. In addition, the variable focusing optic 40 functions as an objective of the imaging system 34. The adjustment matches the center of curvature of the spherical illumination wavefront 46 to the center of curvature of the intended shape of the instant subaperture 50 or 50A-50H, both centers of curvature being located at the crossing point 64. The two lens elements 82 and 84 can be moved together or separately for changing the focal length of the variable focusing optic 40 as well as the location of its focal point. In addition, the variable focusing optic 40 maintains the instant subaperture 50 or 50A-50H conjugate to both the illumination field aperture 30 and the detector surface 58. While the variable focusing optic 40 is shown with two displaceable lens elements 82 and 84, the variable focusing optic 40 can take a variety of forms, including combination of three or more lens elements, for repositioning its focal point coincident with the crossing point 64.

Through the imaging system 34, including the variable focusing optic 40, the illuminator field aperture 30 is imaged onto the instant subaperture 50 or 50A-50H of the concave aspheric surface 16, and the instant subaperture 50 or 50A-50H of the aspheric surface 16 is imaged onto the detector surface 58. The location of a virtual focus of the variable focusing optic 40 at crossing point 64 assures that the illumination wavefront 46 has a curvature matching the nominal curvature of the instant subaperture 50 or 50A-50H of the concave aspheric surface 16.

For intended shapes of the instant subapertures 50 or 50A-50H that significantly depart from a spherical form beyond the capture range of the wavefront sensor 56, the variable optical aberrator 42 can be adjusted to incorporate predetermined amounts of a defined aberration into the illumination wavefront 48. The variable optical aberrator 42 is depicted as having two relatively displaceable elements 86 and 88 with substantially mirror symmetric higher order surfaces of a type for contributing different amounts of coma to the illumination wavefront 48. The variable optical aberrator 42 can also be arranged to contribute other types of defined aberrations including astigmatism or trefoil. Alvarez lens pairs are known for this purpose with adjustments between the lenses being translational or rotational depending upon the type if aberration.

More than one such variable optical aberrator 42 can be used in succession, located together or straddling the variable focusing optic 40. Although the variable optical aberrator 42 can be located elsewhere in the optical measuring instrument 10, such as in the collimated beam between the beamsplitter 22 and the imaging system 34, the variable optical aberrator 42 is preferably located between the optical system 34 and the concave aspheric surface 16 to minimize the propagation of aberrated wavefronts through the imaging system 34.

The desired amount of any one of the defined aberrations can be determined by fitting the defined aberration to the intended shape of the instant subaperture 50 or 50A-50H. For example, a second order Zernike polynomial term for astigmatism or a third order Zernike polynomial term for coma or trefoil can be fit to a compatible mathematical description of the intended shape of the instant subaperture 50 or 50A-50H. The one or more variable optical aberrators 42 can be adjusted to contribute the best fit amounts of their respective aberrations. The one or more variable optical aberrators 42 are preferably pre-calibrated so that predetermined amounts of their adjustment are matched to the desired amounts of aberration. However, in accordance with another aspect of this invention, the precise form of the illumination wavefront 48 is not required to be known to perform desired measurements.

The wavefront sensor 56 can take a variety of forms including a Shack-Hartman wavefront sensor, a two-arm (e.g., Michelson) interferometer, or a one-arm lateral shearing interferometer, such as an optical metrology high resolution wavefront sensor SID4-HR from Phasics S. A. of Palaiseau, France. For adapting the optical measuring instrument 10 to a two-arm interferometer, a reference mirror can be coupled to the remaining face of the beamsplitter 22. The wavefront sensor 56 compares the shape of the returning test wavefront 54 to a datum surface, e.g., a plane as intended for the depicted measuring instrument 10. The images of the subapertures 50 and 50A-50H captured by the detector surface 58, especially as bounded by the projected image of the illumination field aperture 30 of known size can be directly equated to points on the intended, i.e., ideal, aspheric surface. The wavefront sensor 56, which is preferably sensitive to the local phases of the test wavefront 54, also captures information about the topographic shape of the test wavefront 54 at an array of positions within each subaperture image.

A processor 90 integrated with or otherwise connected to the wavefront sensor 56 and the rotational sensors 80 and 81 derives both position and topographic shape (e.g., height) information from the array of points within each subaperture measurement. Based on the known size of the illumination field aperture 30, whose image is relayed onto the detector surface 58, the spacing between the points within the array can be readily scaled. Based further on the monitored measurement positions (θ, φ), the array of points can be linked to angular positions on the concave aspheric surface 16.

Figures 4, 5:
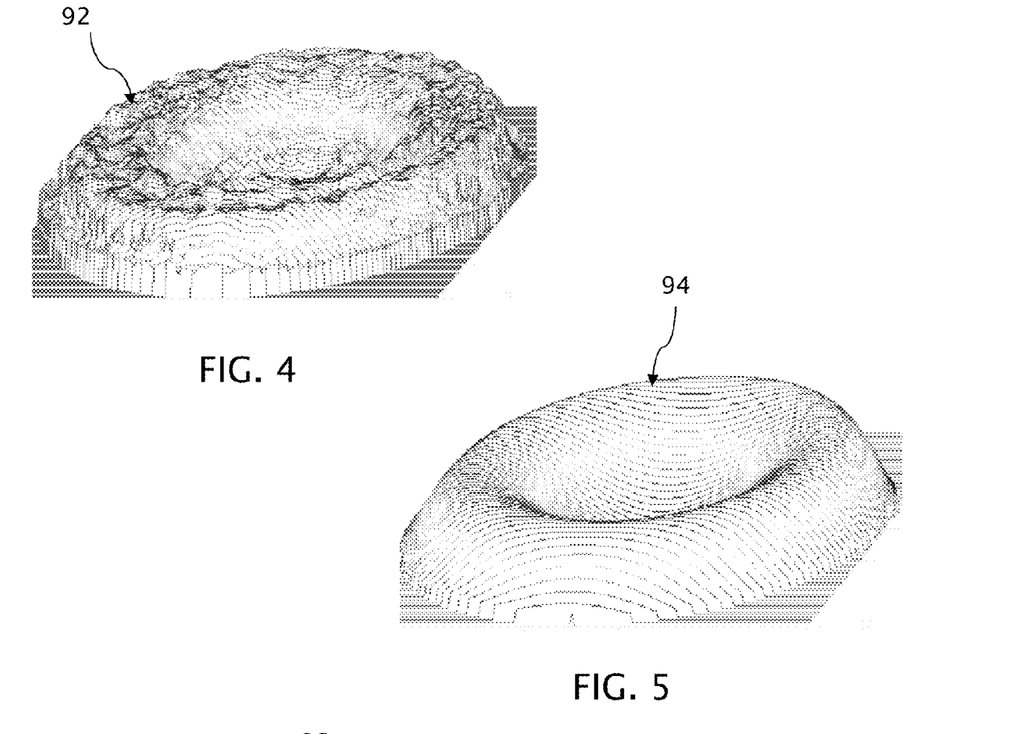
FIG. 4 depicts a subaperture data map containing topographic shape information extracted from the subaperture measurements.
FIG. 5 depicts a fitted subaperture data map containing low-frequency topographic shape information extracted from the subaperture measurements.

As depicted in FIG. 4, the shape information embodied in the test wavefront 54 includes topographic shape information about the instant subapertures 50 and 50A-50H as well as additional information relating to the difference between the illumination wavefront 48 and the intended, i.e., ideal, shape of the instant subapertures 50 and 50A-50H. In general, the additional information associated with the imperfect form of the illumination wavefront 48 is of the order of the aberrations (e.g., Zernike polynomial terms) required to define the intended shapes of the subapertures 50 and 50A-50H. Some such aberrations can be left unmatched by the illumination wavefront 48 and other such aberrations can be only partially matched by the illumination wavefront 48 while remaining within the measurement range of the wavefront detector 56. While the additional information can mask lower order (i.e., the order of the aberrations required to define the intended topographic shapes of the subapertures 50 and 50A-50H (referred to as low-frequency shape information), the additional information has progressively less relevance to higher order local shape information confined within the Nyquist measurement limit (referred to as mid-frequency shape information). High-frequency shape information is generally precluded by the limited number of measurement points within the wavefront detector 56. The mid-frequency information provides measurements of surface characteristics such as waviness.

Figure 6:
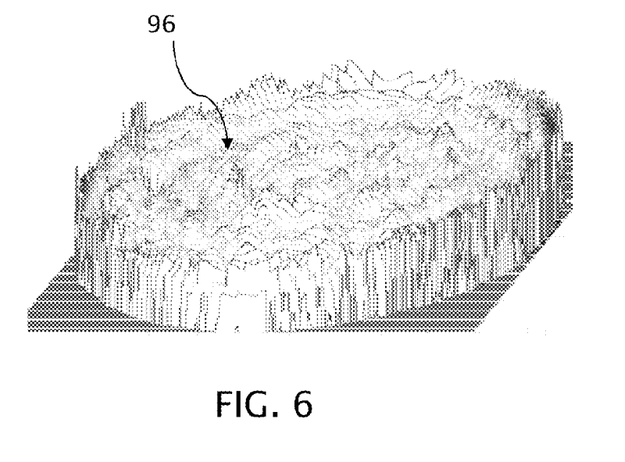
FIG. 6 depicts a mid-frequency subaperture data map derived by removing the low-frequency topographic shape information from the original topographic shape information extracted from the subaperture measurements.
Figure 7:
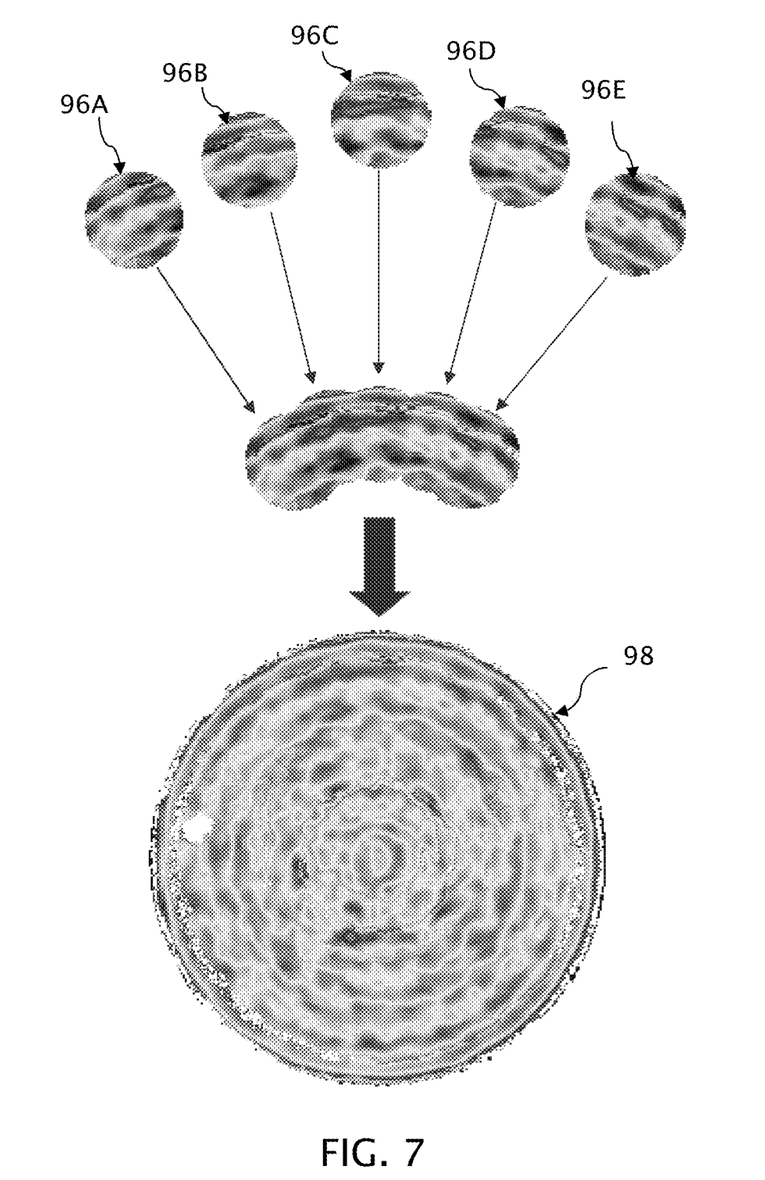
FIG. 7 depicts the assembly of mid-frequency subaperture data maps into a profile map of the concave aspheric surface.

The processor 90 processes the shape information (e.g., subaperture data map 92) extracted from the test wavefront 54 as shown in FIG. 4 and fits a low-frequency mathematical definition (e.g., fitted subaperture data map 94) to the extracted shape information as shown in FIG. 5, preferably in the same terms to which conventional aberrations were originally fit to the intended shape of the instant subapertures 50 or 50A-50H. For example, the low-frequency mathematical definition can include conventional lower order Zernike terms for piston, tip, tilt, and defocus, as well as various terms for astigmatism, coma, and trefoil. Any higher order terms necessary for defining the intended shape of the concave aspheric surface 16 but not of sufficient order to define the surface characteristics described by the desired mid-frequency measurement can also be included in the fitted mathematical definition (fitted subaperture data map 94). The fitted mathematical definitions (fitted subaperture data maps 94) of the shape information extracted from the test wavefront 54 (i.e., the low frequency shape information) can be subtracted from the shape information (subaperture data maps 92) extracted from the test wavefronts 54, leaving mid-frequency shape information (e.g., mid-frequency subaperture topographic maps 96) corresponding to the surface characteristics of the subapertures 50 and 50A-50H as shown in FIG. 6. With the position of each point within each subaperture 50 and 50A-50H being known and with the low-frequency shape information (fitted subaperture data maps 94) being removed from the captured shape information (subaperture data maps 92) at each point, the points within the plurality of subaperture measurements can be readily assembled together as shown in FIG. 7, such as by optimizing a simple piston adjustment between the mid-frequency subaperture topographic maps 96A-96E, for obtaining a mid-frequency profile map 98 of the entire concave aspheric surface 16.

Alternatively, the lower order (low-frequency) shape information within each measured subaperture can be allowed to arbitrarily vary to minimize lower order differences between the overlapping portions of the subapertures. Once the differences between the overlapping regions are minimized, the lower order values of the shape information required to minimize these differences can be subtracted or otherwise distinguished from the remaining higher order values of the shape information to produce the desired profile map 98 of the concave aspheric surface 16.

The fitted lower order aberrations can include aberrations necessary to define the intended topographic shapes of the subapertures 50 and 50A-50H but not among the aberrations contributed by the variable focusing optic and one or more variable optical aberrators 42. For example, the single variable optical aberrator 42 may have been used to contribute different amounts of a particular aberration (e.g., coma) to the illumination wavefront 48 to assure that all of the measurements are within the measurement range of the wavefront detector 56 without making any adjustments to other lower order aberrations (e.g., spherical aberration or trefoil) necessary to define the intended shape of the subapertures 50 and 50A-50H. If the fitted lower order mathematical definitions (fitted subaperture data maps 94) of the shape information extracted from the test wavefront 54 include corresponding terms for the uncorrected aberrations (e.g., spherical aberration and trefoil), any departure in the values of these terms from the values of corresponding terms in the mathematical description of the intended, i.e., ideal, shape of the subapertures 50 and 50A-50H can be largely attributed to topographic errors in the concave aspheric surface 16. These additional errors from each of the subapertures 50 and 50A-H can be assembled together and appended to the profile map 98 or combined with the mid-frequency subaperture topographic maps 96A-96E and assembled into a profile map that contains an expanded range of profile variations.

In addition, the magnitude of the aberration imposed by the variable optical aberrator 42 e.g., coma, can be inferred from monitoring the relative movements of the displaceable elements 86 and 88 in association with empirically or theoretically derived contributions of the variable optical aberrator 42 in the monitored positions. The fitted corresponding order mathematical definitions (fitted subaperture data maps 94) of the shape information extracted from the test wavefront 54 include not only errors in the shape of the concave aspheric surface 16 within the measured subapertures 50 and 50A-50H but also any remaining uncorrected contributions of the illumination wavefront 48. The latter can be estimated from the difference between the ideal magnitude of the aberration needed for defining the intended shape component of the subapertures 50 and 50A-50H and the inferred magnitude of aberration supplied by the optical aberrator. Thus, the magnitude of the corresponding aberration error in the actual shape of the measured subapertures 50 and 50A-50H can be estimated by accounting for difference between the magnitude of the inferred aberration imposed by the variable optical aberrator 42 and the corresponding aberration needed to define the intended shape of the subapertures 50 and 50A-50H. As described above, the is estimated error component can be appended to the mid-frequency or other calculated errors within each of the subapertures 50 and 50A-50H and assembled together to construct a more comprehensive error profile map of the aspheric surface 16. Alternatively, preassembled low-frequency and mid-frequency profile maps can be combined to obtain the more comprehensive error profile map. The estimated error components may be of sufficient accuracy for a certain class of aspheric surfaces. A similar procedure can be followed for estimating curvature errors based on the monitored contribution of the focusing optic 40.

In a more general sense, any aberrations needed to define the intended surface that remain uncorrected or are only partially corrected within the illumination wavefront appear in a predictable fashion within the test wavefront, and the errors registered by the test wavefront can be discounted to remove for these predictable influences from the measurements. The predicable influences of the uncorrected aberrations can be ascertained directly, and the predictable influences of the only partially corrected aberrations can be estimated or otherwise inferred from the monitored settings of the measuring instrument or from other sources such as from overlapping measurements.

Figure 8:
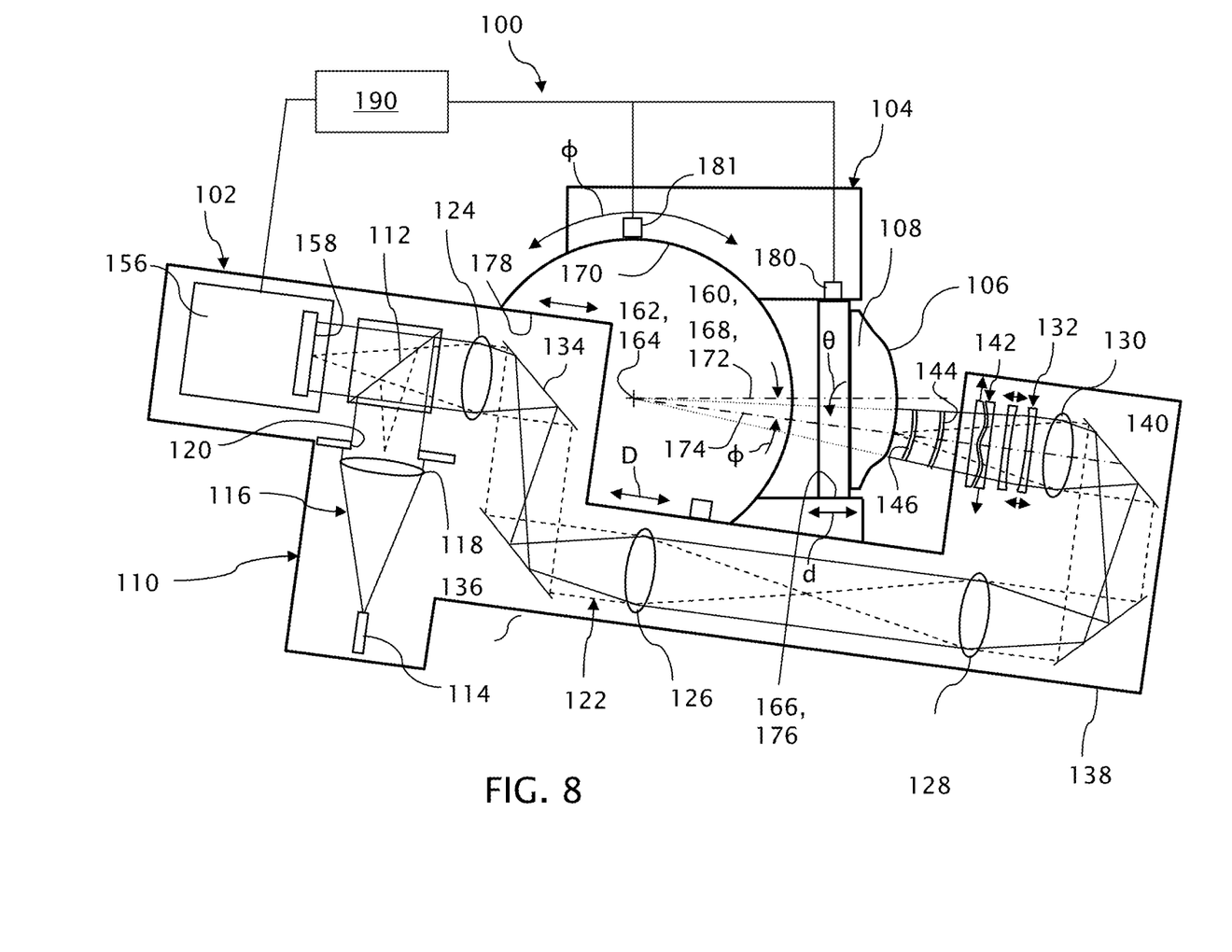
FIG. 8 is a schematic diagram of an optical measuring instrument for measuring a convex aspheric surface in accordance with another embodiment of the invention.

Another configuration of an optical measuring instrument for measuring convex surfaces of test objects is depicted in FIG. 8. Although incorporating many elements in common with the earlier described measuring instrument 10, the optical measuring instrument 100 includes a measuring arm 102 and a multi-axis drive platform 104 adapted to the measurement of a test object 108 having a generally convex aspheric freeform surface 106, which is subject to measurement.

Similar to the preceding embodiment, an illuminator arm 110 is optically coupled to the measuring arm 10 through a beamsplitter 112. A light source 114 provides an expanding measuring beam 116 that is collimated by a collimating lens 118 and sized by an illumination field aperture 120. The beamsplitter 122 reflects a portion of the collimated measuring beam 116 into the measuring arm 112.

An 8f imaging system 122 carried by the measuring arm 112 includes lens elements 124, 126, 128, and 130 as well as a variable focusing lens 132 for forming an image of the illumination field aperture 120 onto the convex aspheric surface 106. The lens element 124 is spaced at one focal length from the illumination field aperture 120, and the lens elements 124, 126, 128, and 130 are all spaced apart from each other through two focal lengths. The additional lens elements 128 and 130 of the imaging system 122 function as a relay for extending the length of the measuring arm 112. Fold mirrors 134, 136, 138, and 140 between the lens element 124, 126, 128, and 130 shape the measuring arm 112 for reorienting the measuring beam 116. Both the length of the measuring arm 102 and the orientation of the measuring beam 116 can be adapted to the desired measurement. The variable focusing optic 132, which functions as an objective of the imaging system 122, converts the shape of the measuring beam 116 from a collimated beam having a planar illumination wavefront (not shown) into a converging beam having a spherical illumination wavefront (also not shown) while imaging the illumination field aperture 120 onto the convex aspheric surface 106 (i.e., the field conjugates). The imaging system 122 including the variable focusing optic 132 can take a variety of forms such as described in the preceding embodiment for performing their desired imaging and wavefront shaping functions.

A variable optical aberrator 142 for further shaping an illumination wavefront 144 is preferably carried by the measuring arm 102 in a position adjacent to the variable focusing optic 132 (i.e., on either side of the variable focusing optic 132). The variable optical aberrator 142 contributes higher order aberration to the further propagating aspheric illumination wavefront 144, such as astigmatism, coma, or trefoil.

Figure 9:
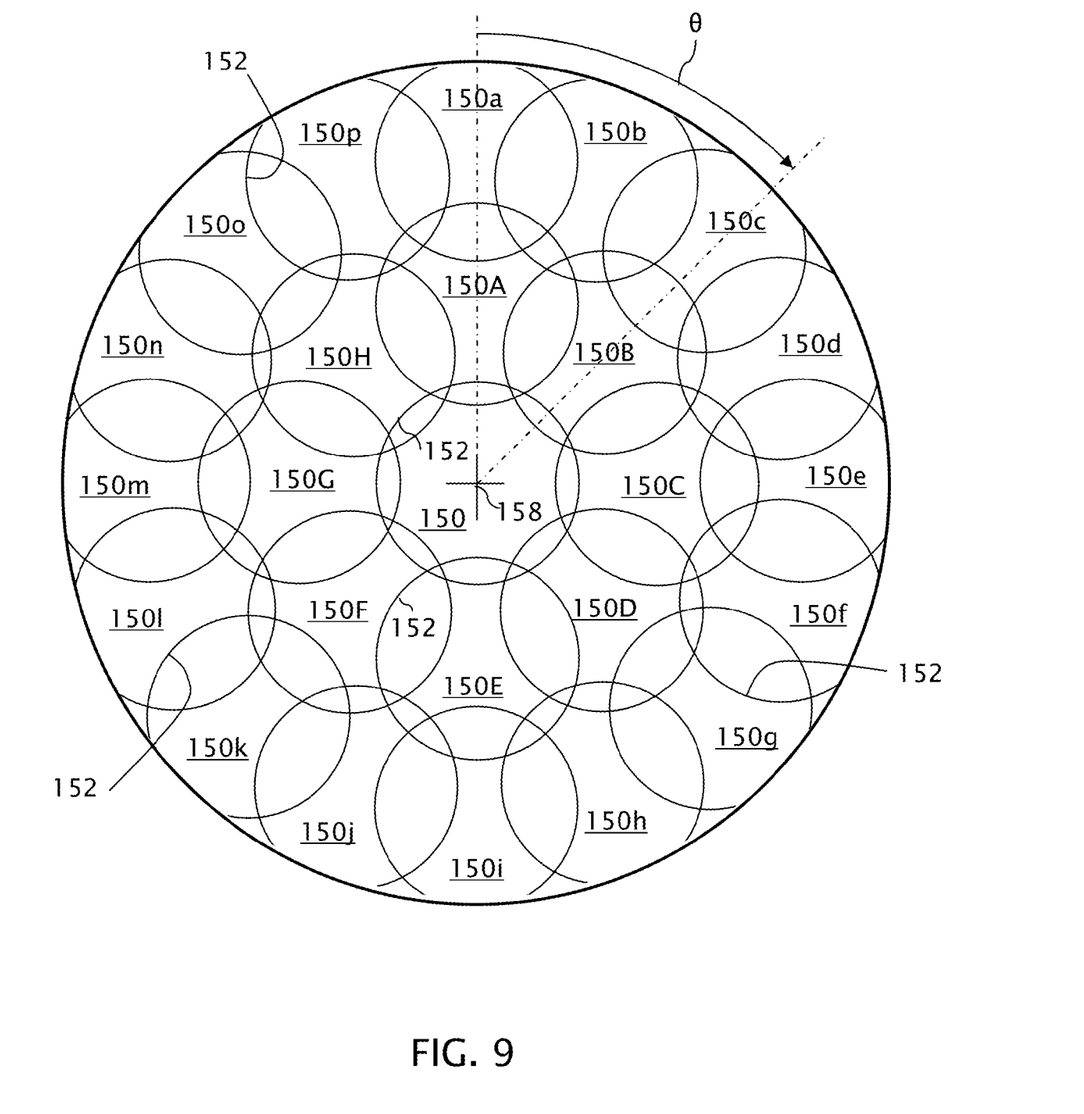
FIG. 9 is an on-axis view of the convex aspheric surface showing a plurality of subaperture subject to measurement.

The converging measuring beam 116 illuminates a subaperture 150E of the convex aspheric surface 106 within the illuminated area bounded by an image 152 of the illumination field aperture 120 (see FIG. 9). The aspheric illumination wavefront 144 is shaped to at least approximately correspond to the intended, i.e., ideal, topographic shape of the convex aspheric surface 106 within the subaperture 150E. The intended topographic shape of the aspheric surface 106 within the subaperture 150E to which the illumination wavefront 144 is shaped is generally defined by a mathematical description or admits of such a definition. For convenience, the mathematical description of the intended subaperture shape is preferably drawn in terms of aberrations including terms for piston, tip and tilt, a defocus term for defining the overall radial curvature of the subaperture 150E and any other needed radial or azimuthal terms such as for astigmatism, coma, trefoil, and spherical aberration.

Since the illumination wavefront 144 is shaped to at least approximately match the intended topographic shape of the subaperture 150E, the converging measuring beam 116 substantially retroreflects from the convex aspheric surface 106 as a diverging measuring beam 116 with a test wavefront 146 having a shape incorporating twice the optical path length differences between the shape of the illumination wavefront 144 and the actual topographic shape of the subaperture 150E. The returning measuring beam 116 propagates back through the variable optical aberrator 142 and the imaging system 122, including the variable focusing optic 132, to the beamsplitter 112, which transmits at least a portion of the returning measuring beam 116 to a wavefront sensor 156.

A detector surface 158 of the wavefront sensor 156 is preferably spaced from the imaging lens element 124 at its focal length. Thus, the illumination field aperture 120, the detector surface 158, and the subaperture 150E of the convex aspheric surface 106 are all optically conjugate, and the imaging system 122 forms an image of the subaperture 150E together with the projected illumination field aperture 120, which forms the boundary 152 of the subaperture 150E, onto the detector surface 158.

The multi-axis drive platform 104 includes first and second rotational axes 160 and 162 that preferably intersect at a crossing point 164 in an orthogonal orientation. The first rotational axis 160, which is preferably guided by a rotational air bearing 166, rotates the test object 108 together with the convex aspheric surface 106 about a central axis 168 of the aspheric surface 16 through a full $2\pi$ range of azimuthal angles $\theta$. The second rotational axis 162, which is preferably guided by a rotational air bearing 170, pivots the measuring arm 102 through a range of polar angles $\phi$. The relative rotations of (a) the aspheric surface 106 through azimuthal angles $\theta$ and (b) the measuring arm 102 through polar angles $\phi$ define a succession of subaperture measurement positions in which different subapertures, e.g., subapertures 150, 150A-150H, or 150a-150p of the aspheric surface 106 as shown in FIG. 9, are illuminated and imaged onto the detector surface 158.

The multi-axis drive platform 104 also includes first and second translational axes 172 and 174. The first translational axis 172, which is preferably coincident with the first rotational axis 160 and guided by a roller bearing 176, translates the aspheric surface 106 with respect to the crossing point 64 of the rotational axes 160 and 162 through various displacements d. The second translational axis 174, which is preferably guided by a roller bearing 178, translates the measuring arm 12 with respect to the crossing point 164 of the rotational axes 160 and 162 through various displacements D. In the view of FIG. 8, where the polar angle $\phi$ assumes a non-zero angle, the second translational axis 174 is inclined to both the first rotational axis 160 and the first translational axis 172, Rotational sensors 180 and 181 monitor the angular positions of the rotational axis 160 and 162 for monitoring each of a succession of measurement positions ($\theta$, $\phi$), such as shown in FIG. 9 as subapertures 150, 150A-150H, and 150a-150p, for measuring the entire aspheric surface 106 or as much of the aspheric surface 106 for which measurement data is needed. The entire aspheric surface 106 as shown in FIG. 9 is captured by (a) one on-axis measurement, where of angle $\phi$ equals zero corresponding to subaperture 150, (b) eight off-axis measurements, where angle $\phi$ equals a first non-zero constant and $\theta$ equals a multiple of $\pi/4$ corresponding to subapertures 150A-150H, and (c) sixteen off-axis measurements, where angle $\phi$ equals a second greater non-zero constant and $\theta$ equals a multiple of $\pi/8$ corresponding to subapertures 150a-150p. More or less measurement positions ($\theta$, $\phi$) can be used for measuring the aspheric surface 106 with differently sized subapertures or different aspheric surfaces.

At any one measurement position ($\theta$, $\phi$), the aspheric surface 106 is preferably displaced a distance d along the first translational axis 172 so that the center of curvature of the intended topographic shape of the subaperture 150 or any one of the other subapertures 150A-150H or 150a-150p is located at the crossing point 164 of the two rotational axes 160 and 162. The local center of curvature can be determined as a best fit spherical surface to the intended topographic shape of the aspheric surface 106 within the instant subaperture 150, 150A-150H, or 150a-150p. For example a second order Zernike polynomial including a term for defocus (i.e., field curvature) can be fit to a mathematical representation of the intended topographic shape of the instant subaperture 150, 150A-150H, or 150a-150p.

The measuring arm 102 at the instant measurement position ($\theta$, $\phi$) is preferably displaced a distance D along the second translational axis 174 so that the instant subaperture 150, 150A-150H or 150a-150p of the aspheric surface 106 remains conjugate to both the detector surface 158 and the illumination field aperture 120. The illuminator aperture 120, the imaging system 122, and the detector surface 158, all move together with the measuring arm 102, so that the displacement D of the measuring arm 102 along the second translational axis 174 compensates for the displacement of the aspheric surface 106 along the first translational axis 172.

The variable focusing optic 132, which is depicted as having two displaceable lens elements (not demarcated), is preferably adjusted to position its focal point at the crossing point 164 between the two rotational axes. In addition, the variable focusing optic 132 functions as an objective of the imaging system 122. The adjustment matches the nominal center of curvature of the illumination wavefront 144 to the nominal center of curvature of the intended shape of the instant subaperture 150, 150A-150H, 150a-150p, both centers of curvature being located at the crossing point 164. The two lens elements of the variable focusing optic 132 can be moved together or separately for changing the focal length of the variable focusing optic 132 as well as the location of its focal point. In addition, the variable focusing optic 132 maintains the instant subaperture 150, 150A-150H, or 150a-150p conjugate to both the illumination field aperture 120 and the detector surface 158. The variable focusing optic 132 can take a variety of forms, including combination of three or more lens elements, for repositioning its focal point coincident with the crossing point 164.

For intended shapes of the instant subapertures 150, 50A-50H, or 150a-150p that significantly depart from a spherical form beyond the capture range of the wavefront sensor 156, the variable optical aberrator 142 can be adjusted to incorporate predetermined amounts of a defined aberration into the test wavefront 144. The variable optical aberrator 142 is depicted as having two relatively displaceable elements with substantially mirror symmetric higher order surfaces of a type for contributing different amounts of coma to the test wavefront 144. The variable optical aberrator 142 can also be arranged to contribute other types of defined aberrations including astigmatism or trefoil. Alvarez lens pairs are known for this purpose with adjustments between the lenses being translational or rotational depending upon the type if aberration.

More than one such variable optical aberrator 142 can be used in succession, located together or straddling the variable focusing optic 132. Although the variable optical aberrator 142 can be located elsewhere in the optical measuring instrument 10, such as in the collimated beam between the beamsplitter 112 and the imaging system 122, the variable optical aberrator 142 is preferably located between the optical system 132 and the aspheric surface 106 to minimize the propagation of aberrated wavefronts through the imaging system 122.

The desired amount of any one of the defined aberrations can be determined by fitting the defined aberration to the intended, i.e., ideal, shape of the instant subaperture 150, 150A-150H or 150a-150p. For example, a second order Zernike polynomial term for astigmatism or a third order Zernike polynomial term for coma or trefoil can be fit to a compatible mathematical description of the intended shape of the instant subaperture 150, 150A-150H or 150a-150p. The one or more variable optical aberrators 142 can be adjusted to contribute the best fit amounts of their respective aberrations. The one or more variable optical aberrators 142 are preferably pre-calibrated so that predetermined amounts of their adjustment are matched to the desired amounts of aberration. However, in accordance with another aspect of this invention, the precise form of the illumination wavefront 144 is not required to be known to perform desired measurements.

Similar to the wavefront sensor 56, the wavefront sensor 156 can take a variety of forms for comparing the shape of the returning test wavefront 146 to a datum surface, e.g., a plane as intended for the depicted measuring instrument 100. The images of the subapertures 150, 150A-150H or 150a-150p captured by the detector surface 158, especially as bounded by the projected image of the illumination field aperture 120 of known size can be directly equated to points on the intended, i.e., ideal, aspheric surface. The wavefront sensor 156, which is preferably sensitive to the local phases of the test wavefront 146, also captures information about the topographic shape of the test wavefront 146 at an array of positions within each subaperture image.

A processor 190 integrated with or otherwise connected to the wavefront sensor 156 and the rotational sensors 180 and 181 derives both position and topographic shape (e.g., height) information from the array of points within each subaperture measurement. Based on the known size of the illumination field aperture 120, whose image is relayed onto the detector surface 158, the spacing between the points within the array can be readily scaled. Based further on the monitored measurement positions (θ, φ), the array of points can be linked to angular positions on the aspheric surface 16.

The shape information embodied in the test wavefront 146 includes topographic shape information about the instant subapertures 150, 150A-150H or 150a-150p as well as additional information relating to the difference between the illumination wavefront 144 and the intended, i.e., ideal, shape of the instant subapertures 150, 150A-150H or 150a-150p. In general, the additional information associated with the imperfect form of the illumination wavefront 144 is of the order of the aberrations (e.g., Zernike polynomial terms) required to define the intended shapes of the subapertures 150, 150A-150H or 150a-150p. Some such aberrations can be left unmatched by the illumination wavefront 144 and other such aberrations can be only partially matched by the illumination wavefront 144 while remaining within the measurement range of the wavefront detector 156. While the additional information can mask lower order (i.e., the order of the aberrations required to define the intended topographic shapes of the subapertures 150, 150A-150H or 150a-150p (referred to as low-frequency shape information), the additional information has progressively less relevance to higher order local shape information confined within the Nyquist measurement limit (referred to as mid-frequency shape information). High-frequency shape information is generally precluded by the limited number of measurement points within the wavefront detector 156. The mid-frequency information provides measurements of surface characteristics such as waviness.

The processor 190 processes the shape information (e.g., a subaperture data map) extracted from the test wavefront 146 and fits a low-frequency mathematical definition (e.g., a fitted subaperture data map) to the extracted shape information, preferably in the same terms to which conventional aberrations were originally fit to the intended shape of the instant subapertures 150, 150A-150H or 150a-150p. For example, the low-frequency mathematical definition can include conventional lower order Zernike terms for piston, tip, tilt, and defocus, as well as various terms for astigmatism, coma, and trefoil. Any higher order terms necessary for defining the intended shape of the aspheric surface 106 but not of sufficient order to define the surface characteristics described by the desired mid-frequency measurement can also be included in the fitted mathematical definition (fitted subaperture data map). The fitted mathematical definitions (fitted subaperture data maps) of the shape information extracted from the test wavefront 146 (i.e., the low frequency shape information) can be subtracted from the shape information (subaperture data maps) extracted from the test wavefronts 146, leaving mid-frequency shape information (e.g., mid-frequency topographic maps) corresponding to the surface characteristics of the subapertures 150, 150A-150H or 150a-150p. With the position of each point within each subaperture 150, 150A-150H or 150a-150p being known and with the low-frequency shape information (fitted subaperture data maps) being removed from the captured shape information (subaperture data maps) at each point, the points within the plurality of subaperture measurements can be readily assembled, such as by optimizing a simple piston adjustment between the mid-frequency topographic measurements of the subapertures 150, 150A-150H or 150a-150p, for constructing a profile map of the entire convex aspheric surface 106 containing measurements of mid-frequency errors.

Alternatively, the lower order (low-frequency) shape information within each measured subaperture can be allowed to arbitrarily vary to minimize lower order differences between the overlapping portions of the subapertures. Once the differences between the overlapping regions are minimized, the lower order values of the shape information required to minimize these differences can be subtracted or otherwise distinguished from the remaining higher order values of the shape information to produce the desired mid-frequency topographic map of the aspheric surface 106.

The fitted lower order aberrations can include aberrations necessary to define the intended topographic shapes of the subapertures 150, 150A-150H or 150a-150p but not among the aberrations contributed by the variable focusing optic and one or more variable optical aberrators 142. For example, the single variable optical aberrator 142 may have been used to contribute different amounts of a particular aberration (e.g., coma) to the illumination wavefront 144 to assure that all of the measurements are within the measurement range of the wavefront detector 156 without making any adjustments to other lower order aberrations (e.g., spherical aberration or trefoil) necessary to define the intended shape of the subapertures 150, 150A-150H or 150a-150p. If the fitted lower order mathematical definitions (fitted subaperture data maps) of the shape information extracted from the test wavefront 54 include corresponding terms for the uncorrected aberrations (e.g., spherical aberration and trefoil), any departure in the value of these terms from the value of corresponding terms in the mathematical description of the intended, i.e., ideal, shape of the subapertures 150, 150A-150H or 150a-150p can be largely attributed to topographic errors in the aspheric surface 106. These additional errors can be appended to the mid-frequency subaperture topographic maps and assembled into the profile map to expand the range of profile variations that can be represented by the profile map.

Figure 10:
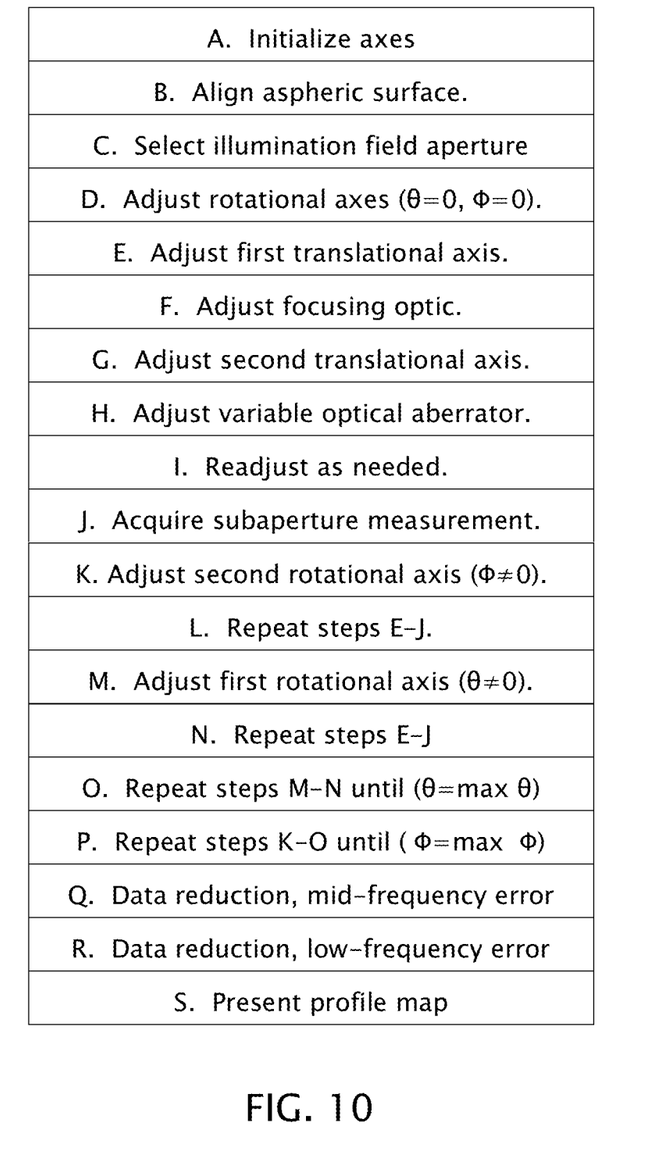
FIG. 10 is a flow chart of a control system for operating the optical measuring instrument.

An example of a procedure for operating the optical measuring instrument 10 and 100 is laid out in FIG. 10. For simplicity, the procedure makes reference to just the components of the measuring instrument 10 but the procedure applies equally to the measuring instrument 100 and other such instruments that a similarly configured.

Steps A through D prepare the measuring instrument 10 for measuring a given test optic 18. At step A, the rotational bearing 66 is aligned so that its axis, the first rotational axis 60, intersects the second rotational axis 62 of the rotational bearing 70. In addition, the rotational bearing 66 is adjusted along the first translational axis 72 via the linear bearing 76 to locate a predefined base radius of an aspheric surface 16 with respect to the measuring instrument 10. The desired location accounts for the expected center thickness of test object 18 along with the predefined nominal curvature of surface 16 such that when the test object 18 is placed onto the rotational bearing 66, the predefined nominal center of curvature of the aspheric surface 16 is located at the crossing point 64. At step B, the test object 18 is placed onto the rotational bearing 66. Tip, tilt, and translation controls are used to align the aspheric surface 16 to the first rotational axis 60 of the rotational bearing 66. At step C, an illumination field aperture 30 is selected having an aperture of desired size. At step D, test part 18 is rotated about the first rotational axis 60 via the rotational bearing 66 to an initial measuring position at θ=0, and the measuring arm 12 is rotated about the second rotational axis 62 via the rotational bearing 70 to a central measuring position at φ=0.

Steps E-P provide for acquiring data from a succession of subapertures 50 and 50A-H. At step E, the rotational bearing 66 is adjusted through a distance d along the first translational axis 72 via the linear bearing 76 to locate a predefined nominal center of curvature of a given subaperture, i.e., the subaperture 50 or later the subapertures 50A-H, at the crossing point 64. At step F, one or more of the lens elements 82 or 84 of the variable focusing optic 40 are moved to adjust the focal length for the variable focusing optic 40 in accordance with both the intended local curvature of the given subaperture 50 or 50A-H of the aspheric surface 16 and the expected gap between the variable focusing optic 40 and the aspheric surface 16. At step G, the measuring arm 12 is adjusted through a distance D along the second translational axis 72 via the linear bearing 78 until the focus of the variable focusing optic 40 is positioned at the crossing point 64. At step H, the variable optical aberrator 42 is adjusted as necessary to at least approximate a predefined aberration of the given subaperture 50 or 50A-H of the aspheric surface 16. The variable optical aberrator 42 approximates a defined aberration such as coma, astigmatism, or trefoil as needed based upon the size and intended shape of the aspheric surface 16 within the given subaperture 50 or 50A-H. At step I, the variable focusing optic 40 and the measuring arm 12 are further adjusted as needed to ensure that the given subaperture 50 or 50A-H of the aspheric surface 16 is imaged onto the detector surface 58 (i.e., as an optical conjugate) and the focus of variable focusing optic 40 is located at the crossing point 64. At step J the wavefront sensor 56 records the test wavefront shape for the given subaperture 50 or 50A-H.

At step K, the measuring arm 12 is rotated about the second rotational axis 62 via the rotational bearing 70 to a non-central angle φ relative to aspheric surface 16 for taking additional measurements. At step L, the steps E through J are repeated as necessary to accommodate changes in the intended nominal curvature or aberration of the given subaperture 50A-H as defined by the non-central angle φ and a given angle θ. At step M, the test object 18 is rotated about the first rotational axis 60 via the rotational bearing 66 to a non-zero angle θ. At step N. the steps E through J are again repeated as necessary to accommodate changes in the intended nominal curvature or aberration of the given subaperture 50B-H as defined by the non-central angle φ and the non-zero angle θ. At step O, the steps M through N are repeated until measurements are taken for all given angles θ. At step P, steps K through O are repeated until all measurements are taken for all given angles φ. During each such measurement defined at the angles φ and θ, both the focus of the variable focusing optic 40 and the intended local center of curvature of the aspheric surface 16 within the subapertures 50 and 50A-H remain at the crossing point 64, and each the subapertures 50 and 50A-H remains optically conjugate to both the illumination field aperture 30 and the detector surface 58.

The order at which the adjustments and motions are made, as well as the order in which the measurements are taken, can be varied to achieve the same ends, which include at least approximately matching the shape of the illumination wavefront 48 to the intended localized surface shape within the given subaperture 50 or 50A-H. Not all of the measurements require adjustments to the variable focusing optic 40, the variable optical aberrator 42, or the translational axes 72 and 74 depending upon the departure of the aspheric surface 16 from a spherical form and the range over which the detector 56 can collect accurate data regarding the shape of the test wavefront 54. Measurement data can also be collected regarding the movements of the two rotational axes 60 and 62, the translational axes 72 and 74, the displaceable elements 82 and 84 of the variable focusing optic 40, and the displaceable elements 86 and 88 of the variable optical aberrator 42 as representation of the variation in the location and intended shape of each of the subapertures 50 and 50A-H against which the test wavefront 54 can be compared.

Steps Q through S convert the measurements into a useful form. At step Q, all of the recorded subaperture shapes are scaled (e.g., pixels per millimeter) to the known size of the illumination field aperture 30, the low-order aberrations are removed from each sub aperture measurement, and a piston term is adjusted to reconstruct the measurements of all subapertures 50 and 50A-H into a profile measurement of the aspheric surface 16. At step R, optionally, further data analysis can be performed on the uncorrected low-order aberrations and estimated corrected low-order aberrations (based on measurements of the movement of the aberrator elements 86 and 88) to incorporate error components of the low-order aberrations into the profile measurement. At step P, a completed profile map including mid-frequency errors as well as any incorporated low-frequency errors, is presented as a measurement of the aspheric surface 16. The profile map can be presented numerically or graphically, such a through a graphical user interface, and can be subject to further processing and analysis, such as by comparison to known tolerances. Ultimately, the profile map can be used for such purposes as determining the acceptability of the test part 18, fashioning a plan for correcting the test part 18, or predicting the performance of the test part 18.

Although described with respect to two orthogonal rotational axes and two particular translational axes, other combinations of axes can be used including combinations of axes that produce equivalent kinematic motions or motions defining other types of freeform surfaces. Those of skill in the art will appreciate that these and other variations to the instrument axes and optics can be made within the overall teaching of the invention.

The invention claimed is:

1. An optical measuring instrument for measuring aspheric surfaces, the optical measuring instrument comprising:
   an optical measuring arm including a detector that captures information regarding wavefront shape, and imaging optics incorporating a variable focusing optic that images subapertures of an aspheric surface onto the detector; and
   a multi-axis drive platform including first and second rotational axes that relatively moves the optical measuring arm with respect to the aspheric surface through a plurality of subaperture measurement positions, a first translational axis along which are maintained different centers of curvature associated with a predetermined local shape of the aspheric surface at a crossing point of the first and second rotational axes through the plurality of subaperture measurement positions, and a second translational axis along which are maintained the subapertures of the aspheric surface conjugate to the detector through the plurality of subaperture measurement positions,
   wherein the variable focusing optic maintains a focus of the focusing optic at the crossing point of the first and second rotational axes through the plurality of subaperture measurement positions.

2. The optical measuring instrument of claim 1, wherein the multi-axis drive platform relatively moves the aspheric surface along first translational axis with respect to the crossing point and relatively moves the measuring arm along the second translational axis with respect to the crossing point.

3. The optical measuring instrument of claim 1 further comprising an illumination field aperture having a predetermined size and located optically conjugate to both the subapertures of the aspheric surface and the detector through the plurality of subaperture measurement positions.

4. The optical measuring instrument of claim 3 further comprising sensors that monitor rotational positions of the first and second rotational axes, the detector being arranged to capture subaperture images of the aspheric surface and the illumination field aperture through the plurality of subaperture measurement positions, and a processor that processes the monitored rotational positions and the subaperture images of the aspheric surface and the illumination field aperture to assemble a profile measurement of the aspheric surface.

5. The optical measuring instrument of claim 1, wherein the variable focusing optic shapes an illumination wavefront, and further comprising a variable optical aberrator that adds aberration to the illumination wavefront to substantially match the illumination wavefront to the determined local shape of the aspheric surface.

6. The optical measuring instrument of claim 5, wherein the variable focusing optic functions as an objective and the variable optical aberrator is located adjacent to the variable focusing optic.

7. The optical measuring instrument of claim 5 further comprising a processor that (a) extracts local shape information from the subaperture images of the aspheric surface captured by the detector, (b) distinguishes fitted low-frequency shape information having an order corresponding to an order of aberration that defines the predetermined local shape of the aspheric surface from a remainder of the local shape information yielding mid-frequency profile measurements of the subapertures and (c) assembles the mid-frequency profile measurements of the subapertures to obtain a profile measurement of the aspheric surface.

8. The optical measuring instrument of claim 7, wherein the fitted low-frequency shape information includes terms corresponding to one or more aberrations introduced into the illumination wavefront and other terms corresponding to one or more aberrations not introduced into the illumination wavefront, wherein the value of the other terms within the fitted low-frequency shape information discounted by the value of corresponding terms defining the predetermined local shape of the aspheric surface is processed by the processor to restore low frequency shape information to the profile measurement of the aspheric surface.

9. A method of measuring aspheric surfaces, the method comprising:
mounting a test object having an aspheric surface on a multi-axis drive platform having drive axes that relatively moves an optical measuring arm, including a detector and imaging optics incorporating a variable focusing optic, with respect to the aspheric surface;
relatively rotating the measuring arm with respect to the aspheric surface about two rotational axes to illuminate a succession of subapertures of the aspheric surface and imaging the succession of subapertures onto the detector;
relatively moving the aspheric surface with respect to a crossing point of the two rotational axes to maintain different local centers of curvature associated with the predetermined shape of the aspheric surface at the crossing point through the succession of subapertures;
relatively moving the measuring arm with respect to the crossing point to maintain the subapertures of the aspheric surface conjugate to the detector; and
adjusting the adjustable focusing optic to maintain a focus of the focusing optic at the crossing point through the succession of subapertures.

10. The method of claim 9 further comprising imaging an illumination field aperture having a predetermined size onto both the aspheric surface and the detector through the succession of subapertures.

11. The method of claim 10 further comprising monitoring rotational positions around the rotational axes and processing the monitored rotational positions together with the images of the subapertures of the aspheric surface and the illumination field aperture to provide a profile measurement of the aspheric surface.

12. The method of claim 9 further comprising locating the variable focusing optic between a remainder of the imaging optics and the aspheric surface to shape an illumination wavefront, and adding aberration to the illumination wavefront with a variable optical aberrator to substantially match the illumination wavefront to the predetermined local shape of the aspheric surface.

13. The method of claim 9 further comprising:
extracting local shape information from subaperture images of the aspheric surface;
distinguishing fitted low-frequency shape information having an order corresponding to an order of aberration that defines the predetermined local shape of the aspheric surface from a remainder of the local shape information yielding mid-frequency profile measurements of the subapertures; and
assembling the mid-frequency profile measurements of the subapertures to construct a profile measurement of the aspheric surface.

14. The method of claim 13 wherein the fitted low-frequency shape information includes terms corresponding to one or more aberrations introduced into the illumination wavefront and other terms corresponding to one or more aberrations not introduced into the illumination wavefront, the method further comprising discounting the value of the other terms within the fitted low-frequency shape information by the value of corresponding terms defining the predetermined local shape of the aspheric surface and appending low frequency shape information to the profile measurement of the aspheric surface based on the discounted values.

15. An optical measuring instrument for measuring freeform surfaces, the optical measuring instrument comprising:
an optical measuring arm including a wavefront detector and optics that shape an illumination wavefront and imaging subapertures of a freeform surface onto the wavefront detector as a test wavefront, wherein the optics include a variable focusing optic and a variable optical aberrator that adds aberration to the illumination wavefront to substantially match the illumination wavefront to a predetermined local shape of the aspheric surface within subapertures of the freeform surface;
a multi-axis drive platform that relatively moves the optical measuring arm with respect to the freeform surface through a succession of measurement positions to illuminate the subapertures of the freeform surface and to image the illuminated subapertures onto the detector; and
a processor that (a) extracts local shape information from the imaged subapertures of the freeform surface, (b) distinguishes fitted low-frequency shape information having an order corresponding to an order of aberration that defines the predetermined local shape of the freeform surface from the local shape information yielding mid-frequency profile measurements of the subapertures and (c) assembles the mid-frequency profile measurements of the subapertures to construct a profile measurement of the freeform surface.

16. The optical measuring instrument of claim 15, wherein the variable focusing optic contributes second order defocus to the illumination wavefront and the variable optical aberrator contributes at least one of a second order astigmatism and a third order coma to the illumination wavefront to substantially match the illumination wavefront to the predetermined local shape of the freeform surface within a measurement range of the wavefront detector.

17. The optical measuring instrument of claim 16, wherein the fitted low-frequency shape information includes terms corresponding to the contributions of the variable focusing optic and the variable optical aberrator to the illumination wavefront.

18. The optical measuring instrument of claim 15, wherein the variable focusing optic functions as an objective and the variable optical aberrator is located adjacent to the variable focusing optic.

19. The optical measuring instrument of claim 15, wherein the optical measuring arm includes an illuminator aperture and the optics that shape the illumination wavefront and imaging subapertures of the freeform surface image the illuminator aperture onto the freeform surface and image the illuminator aperture together with the freeform surface onto the wavefront detector.

20. The optical measuring instrument of claim 19, wherein the illuminator aperture has a predetermined size and the processor scales the size of the imaged subapertures to the predetermined size of the illuminator aperture.

21. The optical measuring instrument of claim 15, wherein the multi-axis drive platform comprises:
first and second rotational axes about which the multi-axis drive platform relatively moves the optical measuring arm with respect to the freeform surface through the succession of measurement positions
a first translational axis along which are maintained different centers of curvature associated with a predetermined local shape of the freeform surface at a crossing point of the first and second rotational axes through the succession of measurement positions; and
a second translational axis along which are maintained the subapertures of the freeform surface conjugate to the detector through the succession of measurement positions.

22. The optical measuring instrument of claim 20, wherein the variable focusing optic is adjustable to maintain a focus of the focusing optic at the crossing point of the first and second rotational axis through the succession of measurement positions.

23. A method of measuring freeform surfaces of test objects, the method comprising:
mounting a test object having a freeform surface on a multi-axis drive platform that relatively moves an optical measuring arm with respect to the freeform surface through a succession of measurement positions;
adjustably focusing an illumination wavefront through an adjustable focusing optic to illuminate subapertures of the freeform surface at the succession of measurement positions;
imaging the illuminated subapertures of the freeform surface onto a wavefront detector in the form of test wavefronts reflected from the freeform surface at the succession of measurement positions;
capturing shape information from the test wavefronts that are imaged onto the wavefront detector at the succession of measurement positions;
fitting low-frequency shape information having an order corresponding to an order of aberration that defines the predetermined shape of the freeform surface at the succession of measurement positions
distinguishing the low-frequency shape information from the captured shape information yielding mid-frequency profile measurements of the subapertures; and
assembling the mid-frequency profile measurements of the subapertures to construct a profile measurement of the freeform surface.

24. The method of claim 23, wherein the fitted low-frequency shape information includes terms corresponding to one or more aberrations introduced into the illumination wavefront and other terms corresponding to one or more aberrations not introduced into the illumination wavefront, the method further comprising discounting the value of the other terms within the fitted low-frequency shape information by the value of corresponding terms defining the predetermined local shape of the aspheric surface and appending low frequency shape information to the profile measurement of the aspheric surface based on the discounted values.

25. The method of claim 24, wherein adjustably focusing an illumination wavefront contributes a defocus aberration to the illumination wavefront and the method further comprising further aberrating the illumination wavefront to substantially match the illumination wavefront to the predetermined local shape of the freeform surface.

26. The method of claim 23, further comprising imaging an illumination field aperture having a predetermined size onto both the freeform surface and the wavefront detector at the succession of measurement positions.

* * * * *